United States Patent
Cagno et al.

(10) Patent No.: US 7,526,589 B2
(45) Date of Patent: Apr. 28, 2009

(54) APPARATUS, SYSTEM, AND METHOD FOR RESETTING AN INTER-INTEGRATED CIRCUIT DATA LINE USING A NEGATIVE VOLTAGE

(75) Inventors: Brian James Cagno, Tucson, AZ (US); Kenny Nian Gan Qiu, Tucson, AZ (US); Donald Scott Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 11/626,227

(22) Filed: Jan. 23, 2007

(65) Prior Publication Data
US 2008/0177916 A1  Jul. 24, 2008

(51) Int. Cl.
*G06F 13/00* (2006.01)
*G06F 13/14* (2006.01)

(52) U.S. Cl. .................. 710/110; 710/305
(58) Field of Classification Search .......... 710/106; 326/59; 327/29
See application file for complete search history.

(56) References Cited

U.S. PATENT DOCUMENTS

| | | | |
|---|---|---|---|
| 7,016,993 B2* | 3/2006 | Lee | 710/100 |
| 7,089,338 B1* | 8/2006 | Wooten et al. | 710/110 |
| 2004/0117525 A1* | 6/2004 | Lee | 710/104 |
| 2006/0242348 A1* | 10/2006 | Humphrey et al. | 710/305 |
| 2007/0112990 A1* | 5/2007 | Hayashita | 710/305 |
| 2007/0240019 A1* | 10/2007 | Brady et al. | 714/43 |

OTHER PUBLICATIONS

Greene, Jim; "Implementing an I²C® Reset"; Analog Devices; AN-686; Rev. 0; Dec. 2003; 2 pages.*
Irazabal et al. "I²C Manual"; Philips Semiconductors; AN10216-01; Mar. 24, 2003; all pages.*

* cited by examiner

*Primary Examiner*—Paul R. Myers
*Assistant Examiner*—Ryan M Stiglic
(74) *Attorney, Agent, or Firm*—Kunzler & McKenzie

(57) ABSTRACT

An apparatus, system, and method are disclosed for resetting an inter-integrated circuit (I2C) data line with negative voltage. A hang detection module detects an I2C hung line selected from a data line and a clock line wherein an I2C bus master and I2C bus slave communicate over the data line and the clock line. In response to the detected hung line, a negative voltage generator drives the data line to a specified negative voltage for a specified time interval. A clamp diode clamps the voltage of the data line to greater than a specified limit. On receiving the specified negative voltage, a voltage detector module detects the specified negative voltage of the data line. A timer module detects the specified negative voltage for the specified time interval. In response to detecting the specified negative voltage for the specified time interval, a reset module resets the I2C bus slave.

8 Claims, 2 Drawing Sheets

APPARATUS, SYSTEM, AND METHOD FOR RESETTING AN INTER-INTEGRATED CIRCUIT DATA LINE USING A NEGATIVE VOLTAGE

CROSS-REFERENCES TO RELATED APPLICATIONS

The subject matter of this application is related to two United States patent applications 11/626,220 and 11/626,230, the first entitled "APPARATUS, SYSTEM, AND METHOD FOR RESETTING AN INTER-INTEGRATED CIRCUIT DATA LINE WITH A CLOCK LINE" filed Jan. 23, 2007 and the second entitled "APPARATUS, SYSTEM, AND METHOD FOR AUTOMATICALLY RESETTING AN INTER-INTEGRATED CIRCUIT BUS" filed Jan. 23, 2007.

BACKGROUND OF THE INVENTION

1. Field of the Invention

This invention relates to resetting a bus and more particularly relates to resetting an Inter-Integrated Circuit (I2C) bus.

2. Description of the Related Art

The I2C serial protocol is often used to create a high-level communication path between devices in electronic systems. An I2C bus requires only a clock line and a data line, and operates using a simple communication protocol. The clock line and data line are each bidirectional. Each device connected to an I2C bus has a unique address. A device initiating a transfer is referred to as a bus master while devices responding to the transfer are referred to as bus slaves. Any I2C device may function as the bus master or as a bus slave. The simplicity and flexibility of the I2C bus makes it a cost effective communications solution in many applications.

The I2C bus master typically issues a START command over the I2C bus to other devices, followed by an address of a destination I2C bus slave device. In addition, the I2C bus master also specifies whether data will be read or written. The destination I2C bus slave transmits an ACKNOWLEDGE signal, and the I2C bus master transmits or receives data. When the transfer is complete, the I2C bus master transmits a STOP and the transaction concludes.

Unfortunately, the simplicity of the I2C bus can be a disadvantage if one or more elements of the I2C bus stops functioning, a condition referred to hereafter as a hang. There are only very limited recovery mechanisms built into I2C devices. When an I2C device hangs, the device typically must be reset to free the bus.

Unfortunately, I2C devices are often on different card boundaries within an electronic system. As a result, specific resets are not available for the hung I2C. If a specific reset is not available, a power cycle is required to free the bus. Yet a power cycle is often time consuming and can affect devices and systems far beyond the hung I2C device.

From the foregoing discussion, there is a need for an apparatus, system, and method that reset an I2C device. Beneficially, such an apparatus, system, and method would allow I2C devices to be reset without providing specific reset circuits and without cycling power for an extended system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered as limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
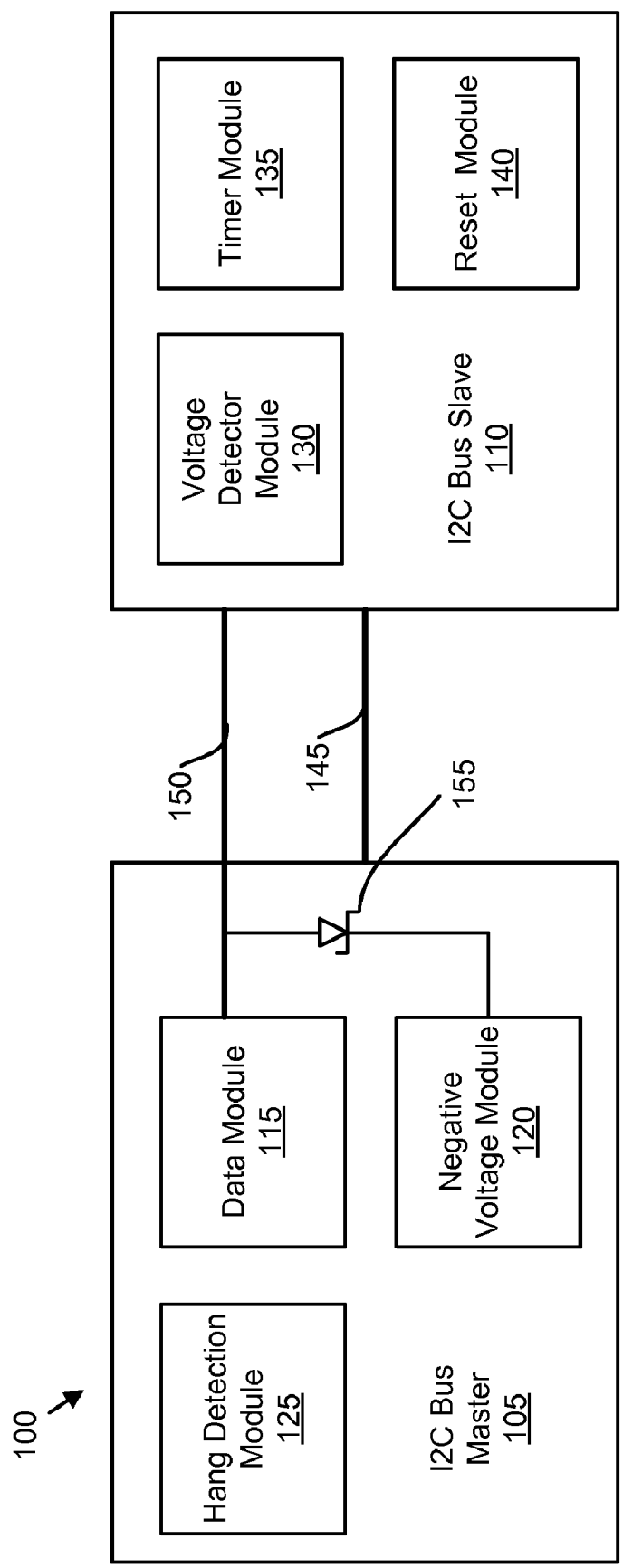
FIG. 1 is a schematic block diagram illustrating one embodiment of an I2C bus slave resetting system in accordance with the present invention.

FIG. 1 depicts a schematic block diagram illustrating one embodiment of an I2C bus slave resetting system 100 in accordance with the present invention. The system 100 includes an I2C bus master 105 and an I2C bus slave 110 in communication over a data line 150 and a clock line 145. Communication between the I2C bus master 105 and the I2C bus slave 110 may be bi-directional. The I2C bus master 105 includes a negative voltage module 120, a clamp diode 155, a data module 115, and a hang detection module 125. The I2C bus slave 110 includes a voltage detector module 130, a timer module 135, and a reset module 140. The I2C bus master 105 and I2C bus slave 110 may be embodied by circuit cards, integrated circuits, portions of integrated circuits, or the like.

In the I2C bus slave resetting system 100, devices initiating communication over the data line 150 are referred to as a bus master 105 while devices responding to communication over the data line 150 are referred to as bus slaves 110. In an embodiment, any of the I2C devices may function as the bus master or as a bus slave. Although for simplicity in the drawings, only one I2C bus master 105 and one I2C bus slave 110 is shown, any number of I2C bus masters 105 and I2C bus slaves 110 may be used in the system 100.

The I2C bus master 105 communicates data over the data line 150 using the clock line 145 from the I2C bus master 105 to the I2C bus slave 110 or from the I2C bus slave 110 to the I2C bus master 105. The communication or transfer of data may be from the I2C bus master 105 to the I2C bus slave 110 or in a reverse direction and is at least at a minimum transfer rate such as one hundred kilohertz (100 kHz) to a maximum of four hundred kilohertz (400 kHz). The hang detection module 125 detects a hung line selected from the data line 150 and the clock line 145. In one embodiment, the line is hung if the data transfer rate is below the minimum value. For example, the hang detection module 125 may detect that the either of the data line 150 or the clock line 145 is hung if a binary value of the data line 150 and/or the clock line 145 does not change over nine (9) clock cycles.

In another embodiment, a state machine of the hang detection module 125 may detect a hung data line 150 and/or clock line 145, if the state machine gets off track. The state machine may include one or more storage elements, typically a D-flip-flop, for each bit of the encoding of a current state. An asynchronous setting of the storage elements to a known state may be affected, for example, by connecting a signal corresponding to the detection of the START condition to the appropriate asynchronous SET or RESET inputs of each storage element. For example, the hang detection module 125 may detect that the state machine gets off track when the data line 150 and the clock line 145 get stuck asserted low and/or high. The hang detection module 125 may comprise a hardware element, a software element as described above, parameters, and an internal organization for detection of the hung data line 150 and/or the hung clock line 145.

In response to the detected hung line, the negative voltage module 120 drives the data line 150 to a specified negative voltage for a specified time interval. A voltage inverter such as a MAX1681 produced by Maxim Integrated Products of Sunnyvale, Calif. or similar may invert the data line voltage to the specified value of negative voltage below ground. In an embodiment, the specified value of the negative voltage is in the range of zero to minus point nine volts (0 to −0.9 V). In another embodiment, the voltage is specified in the range of minus point five volts to minus point eight volts (−0.5 to −0.8 V).

In addition, the negative voltage module 120 may drive the data line 150 to the specified negative voltage for the specified time interval. For example, the negative voltage module 120 may drive the data line 150 to a voltage of minus point seven volts (−0.7 V) for a time interval of five milliseconds (5 ms). The negative voltage module 120 may repeatedly drive the data line 150 to the specified voltage for the specified time interval until the I2C bus slave 110 is reset. Various combinations of the specified negative voltages and the time intervals may be selected from the data module 115.

The clamping diode 155 limits the specified negative voltage to greater than a specified limit. For examples, the clamping diode 155 may limit the negative voltage to no less than minus zero point seven volts (−0.7 V) and ensure the voltage is no greater than minus one volt (−1.0V) to prevent damage to any hardware component on the I2C bus slave 110.

The I2C bus slave 110 communicates with the I2C bus master 105 over the data line 150 and the clock line 145. On receiving the specified negative voltage from the negative voltage module 120 the voltage detector module 130 detects the specified negative voltage on the data line 150. For example, the voltage detector module 130 may detect that the specified negative voltage is −0.7 volts. The detection of specified negative voltage may be automatic. The voltage detector module 130 may comprise one or more hardware elements like a blocking diode and a P-channel Metal Oxide Semiconductor Field Effect Transistor (MOSFET), logic gates, software elements, parameters, and an internal organization for detecting the specified negative voltage.

On detecting the specified negative voltage by the voltage detector module 130, a timer module 135 detects the specified time interval. For example, the timer module 135 may detect that the data line 150 is driven to the specified negative voltage for a specified interval that is substantially equal to four times an inverse of a frequency of the clock line 145. The timer module 135 may comprise one or more hardware elements like a timer function, a counter, and logic gates, software elements, parameters, and an internal organization for detecting the specified interval of time.

In response to the timer module 135 detecting the specified interval of the specified negative voltage, the reset module 140 resets the I2C bus slave 110. For example, if the timer module 135 detects the specified negative voltage of minus point seven volts (−0.7 V) for a time interval of five milliseconds (5 ms), the reset module 140 resets the I2C bus slaves 110. In an embodiment, the apparatus may drive the data line to the specified negative voltage any number of times to reset the I2C bus slaves 110. The reset module 140 may comprise a hardware element, a software configuration, parameters, and other internal organization.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 2:
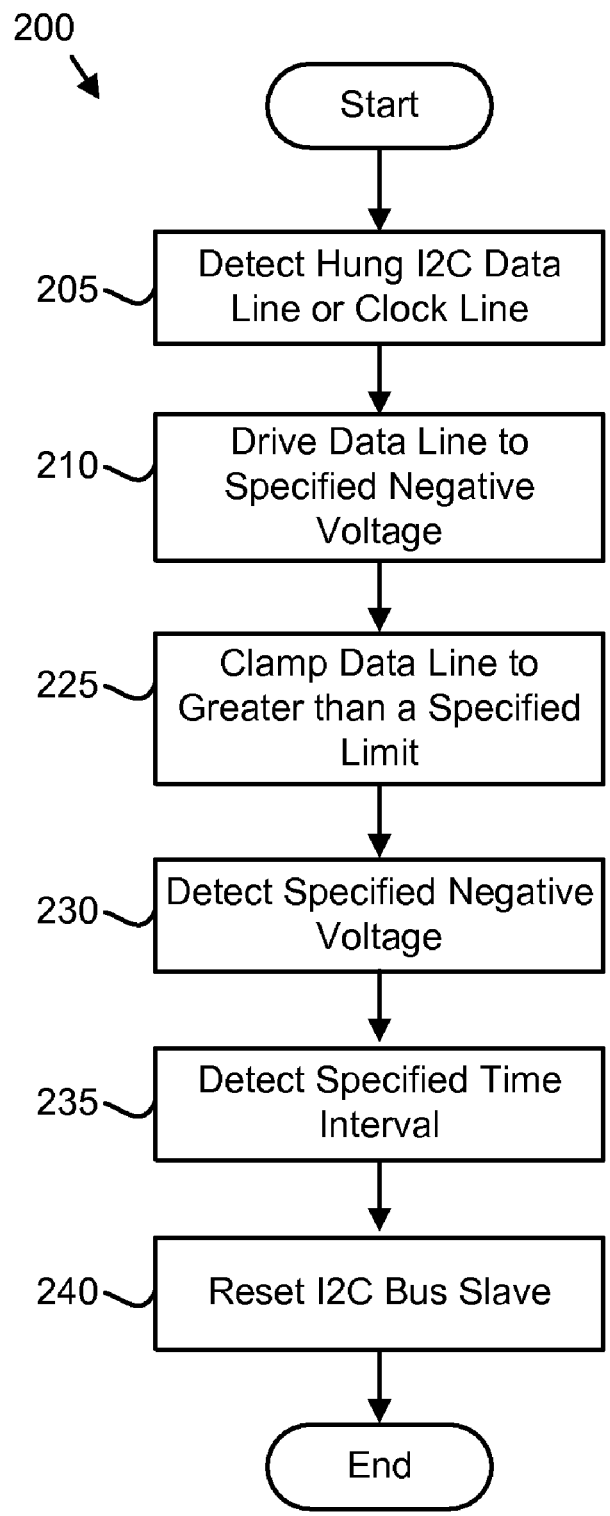
FIG. 2 is a schematic flow chart diagram illustrating one embodiment of an I2C bus slave resetting method in accordance with the present invention.

FIG. 2 is a schematic flow chart diagram illustrating one embodiment of an I2C bus slave resetting method 200 in accordance with the present invention. The method 200 substantially includes the steps to carry out the functions presented above with respect to the operation of the described system 100 of FIG. 1. The description of the method 200 refers to elements of the FIG. 1, like numbers referring to like elements.

The method 200 begins, and in one embodiment, the hang detection module 125 detects 205 a hung line selected from a data line 150 and a clock line 145 of an I2C bus between an I2C bus master and an I2C bus slave, wherein the I2C bus master and the I2C bus slave communicate over the data line 150 and the clock line 145. For example, the hang detection module 125 may detect 205 that communication or transfer of data from the I2C bus master 105 to the I2C bus slave 110 is at the rate less than a minimum rate of hundred kilohertz (100 khz).

Alternatively, the hung detection module 125 may detect 205 a hung line selected from a data line 150 and a clock line 145, if a state machine gets off track. For example, hang detection module 125 may detect 205 a hung line selected from a data line 150 and a clock line 145 if the state machine detects a START condition.

On detecting that the data line 150 is hung, a negative voltage module 120 automatically drives 210 the data line 150 to a specified negative voltage for a specified time interval. In one embodiment, the negative voltage module 120 employs a negative voltage from a negative voltage power line to produce the specified negative voltage. For example, the negative voltage module 120 may drive 210 the data line 150 to minus zero point five volts (−0.5V) by employing a negative voltage power line.

In addition, the negative voltage module 120 may drive 210 the data line 150 to the specified negative voltage for the specified time interval. In one embodiment, the negative voltage module 120 may repeatedly drive 210 the data line 150 to the specified negative voltage for the specified time interval by selecting various combinations of the specified negative voltage and the time interval from the data module 115, until the I2C bus slave 110 is reset.

When the negative voltage module 120 drives the voltage to the specified negative voltage, the clamp diode 155 automatically clamps 225 the negative voltage of the data line 150 to greater than the specified trigger limit. For example, the clamp diode 155 automatically clamps 225 the maximum limit of the specified negative voltage to no less than minus zero point six volts (−0.6V).

On receiving the specified negative voltage from the negative voltage module 120, the voltage detector module 130 detects 230 the specified negative voltage on the data line 150. For example, the voltage detector module 130 may automatically detect 230 that the specified negative voltage on the data line 150 is at least minus point seven volts (−0.7 V) through the blocking diode and simple P-channel MOSFET.

On detecting the specified negative voltage by the voltage detector module 130, a timer module 135 automatically detects 235 the specified time interval. In an embodiment, the timer module 135 detects 235 that the data line 150 is driven to the specified negative voltage for a specified time interval that is substantially equal to four times an inverse of a frequency of the clock line 145. In an alternate example, the timer module 135 may detect 235 that the data line 150 is driven to the specified negative voltage of minus point seven volts (−0.7 V) for a specified interval of ten micro seconds (10 μs).

In response to the timer module 135 detecting 235 the specified interval of the specified negative voltage, the reset module 140 automatically resets 240 the I2C bus slave 110. For example, if the timer module 135 detects 235 that the specified negative voltage is minus point seven volts (−0.7V) for a time interval of five milliseconds (5 ms), the reset module 140 may reset an I2C bus slave 110. The method 200 may select any number of combinations of the specified voltage and specified time intervals to reset each of a plurality of I2C bus slaves 110. After resetting the I2C bus slave 110, the method 200 terminates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A system to reset an Inter-Integrated Circuit (I2C) bus slave, the system comprising:
    an I2C bus master that communicates over a data line and a clock line and comprising
        a hang detection module that detects a hung line selected from the data line and the clock line;
        a negative voltage generator that drives the data line to a specified negative voltage for a specified time interval in response to the detected hung line;
        a clamping diode that limits the specified negative voltage to greater than a specified limit;
    the I2C bus slave that communicates with the I2C bus master over the data line and the clock line and comprising
        a voltage detector module that detects the specified negative voltage on the data line;
        a timer module that detects the specified time interval of the specified negative voltage; and
        a reset module that resets the I2C bus slave in response to the timer module detecting the specified interval of the specified negative voltage.

2. The system of claim 1, wherein the specified negative voltage is in the range of zero to minus point nine volts.

3. The system of claim 2, wherein the specified voltage is in the range of minus point five volts and minus point eight volts.

4. The system of claim 3, wherein the specified interval is substantially equal to four times an inverse of a frequency of the clock line.

5. A method for resetting an I2C bus slave, the method comprising:
    detecting a hung line selected from a data line and a clock line of an I2C bus between an I2C bus master and the I2C bus slave, wherein the I2C bus master and I2C bus slave communicate over the data line and the clock line;
    driving the data line to a specified negative voltage for a specified time interval in response to the detected hung line;
    clamping the voltage of the data line to greater than a specified limit;
    detecting the specified negative voltage on the data line;
    detecting the specified negative voltage for the specified time interval; and
    resetting the I2C bus slave in response detecting the specified negative voltage for the specified time interval.

6. The method of claim 5, wherein the specified negative voltage is in the range of zero to minus point nine volts.

7. The method of claim 6, wherein the specified voltage is in the range of minus point five volts and minus point eight volts.

8. The method of claim 7, wherein the specified interval is substantially equal to four times an inverse of a frequency of the clock line.

* * * * *